United States Patent [19]

Mase et al.

[11] Patent Number: 5,507,157
[45] Date of Patent: Apr. 16, 1996

[54] COLD STORAGE

[75] Inventors: Tokutarou Mase, Tochigi; Yutaka Shimose, Saitama; Toshiyuki Tamura, Tochigi; Yasuhito Kondou, Gunma, all of Japan

[73] Assignee: Sanyo Electric Co., Ltd., Moriguchi, Japan

[21] Appl. No.: 352,537

[22] Filed: Dec. 9, 1994

[30] Foreign Application Priority Data

Dec. 23, 1993 [JP] Japan .................................. 5-347971

[51] Int. Cl.$^6$ ........................................... F25D 17/04
[52] U.S. Cl. .................. 62/418; 62/78; 62/94; 62/440; 426/418
[58] Field of Search ................ 62/78, 418, 94, 62/440; 426/418, 419

[56] References Cited

U.S. PATENT DOCUMENTS 4,845,958  7/1989  Senda ........................................... 62/94
5,228,313  7/1993  Okamoto et al. ............................. 62/94

FOREIGN PATENT DOCUMENTS 4-184071  7/1992  Japan .............................. F25D 23/06

*Primary Examiner*—Ronald C. Capossela
*Attorney, Agent, or Firm*—Darby & Darby

[57] ABSTRACT

An indirectly cooled type cold storage unit adapted to effectively remove ethylene gas generated from storage products, and which can be easily handled during assembly, comprises a heat-insulating outer housing, an inner housing of high heat-conductive material located in the outer housing with a space therebetween and defining therein a storage chamber, and a cooling device for circulating cold air in the space between the outer and inner housings whereby the inner housing is cooled so as to indirectly cool the storage chamber and its contents. An adsorbing and decomposing sheet-like agent composed of ethylene decomposing catalyst and active carbon is provided in communication with the inside of the storage chamber in a manner such that the ethylene gas passes only through the box and not through the space between the two housings.

9 Claims, 4 Drawing Sheets

COLD STORAGE

BACKGROUND OF THE INVENTION

The present invention relates to a cold storage unit comprising a heat-insulating outer housing in which a highly heat-conductive inner housing is located, cold air being circulated between both housings so as to indirectly cool a storage chamber in the inner housing.

In a conventional cold storage unit of this kind, as disclosed in Japanese Laid-Open patent No. 4-184071, a highly heat-conductive inner housing defining therein a storage chamber, is provided in a heat-insulating outer housing with a cold air circulating space therebetween. A cooling device including a cryostat is provided in the cold air circulating space so as to circulate cold air through the cold air circulating space in order to cool the inner housing, thereby the storage space is cooled indirectly through the intermediary of the wall surface of the inner housing.

With this cold storage unit, agricultural products such as vegetables, fruits or fresh flowers stored therein are held at a low temperature without vapor being emitted from the products being absorbed by the circulated cold air, and accordingly, the products can be preserved for a long time, being prevented from being dried and deteriorated.

Further, the above-mentioned agricultural products are alive, and accordingly, generate ethylene gas due to metabolism. There has been a problem that if the metabolism increases the concentration of ethylene gas in the storage chamber, the deterioration rate of the products is accelerated. Accordingly, in the above-mentioned laid-open patent, plate members made of a porous material such as green tuff are attached to the side walls of the inner housing to adsorb the above-mentioned ethylene gas in the porous material, and further, to allow the same to permeate through the plate member into the cold air circulating space in order to restrain the products from deteriorating.

However, the plate members made of the porous material (green tuff) are heavy and fragile, and accordingly, they are not easily handled during the assembly or maintenance of the storage unit. Further, there has been such a problem that the degrees of adsorbability and permeability thereof are low, and accordingly, the reprocessing thereof should have been carried out every one or two years in order to expel adsorbed ethylene gas.

SUMMARY OF THE INVENTION

The present invention is devised to solve the above-mentioned conventional technical problems, and accordingly, one object of a present invention is to provide the so-called indirect cooling type cold storage unit which can effectively remove ethylene gas emitted from stored products and which are easily handled during assembly or maintenance thereof. po According to the present invention, there is provided a cold storage comprises unit having a heat-insulating outer housing, a highly heat-conductive inner chamber located in the outer housing with a space therebetween, and defining therein a storage chamber, a cryostat located in a cold air circulating space defined between the inner and outer housings for indirectly cooling the storage chamber, and adsorbing and decomposing sheet-like agents communicating with the storage chamber, and composed of ethylene decomposing catalyst and active carbon.

Further, in addition to the above-mentioned arrangement, according to the present invention, a box member is attached at a side wall of the inner housing on the cold air circulating space side, and incorporates therein the adsorbing and decomposing sheet-like agents. The upper and lower parts of the box member are communicate with the inside of the storage chamber through holes formed in the side wall of the inner housing.

Further, in addition to the above-mentioned arrangement, according to the present invention, a holding member for movably holding the adsorbing and decomposing sheet-like agents is located in the box member, and the side wall of the inner housing is formed therein with a takeout port corresponding to the inside of the box member, through which the adsorbing and decomposing sheet-like agents are taken out and which is closed with a removable cover.

Further, according to the present invention, the adsorbing and decomposing sheet-like agents are laid vertically at the side wall, and visors are arranged above the adsorbing and decomposing sheet-like agents.

DETAILED DESCRIPTION OF THE PREFERRED EMBODIMENT

Next, an embodiment of the present invention will be explained hereinbelow with reference to the accompanying drawings.

Figure 1:
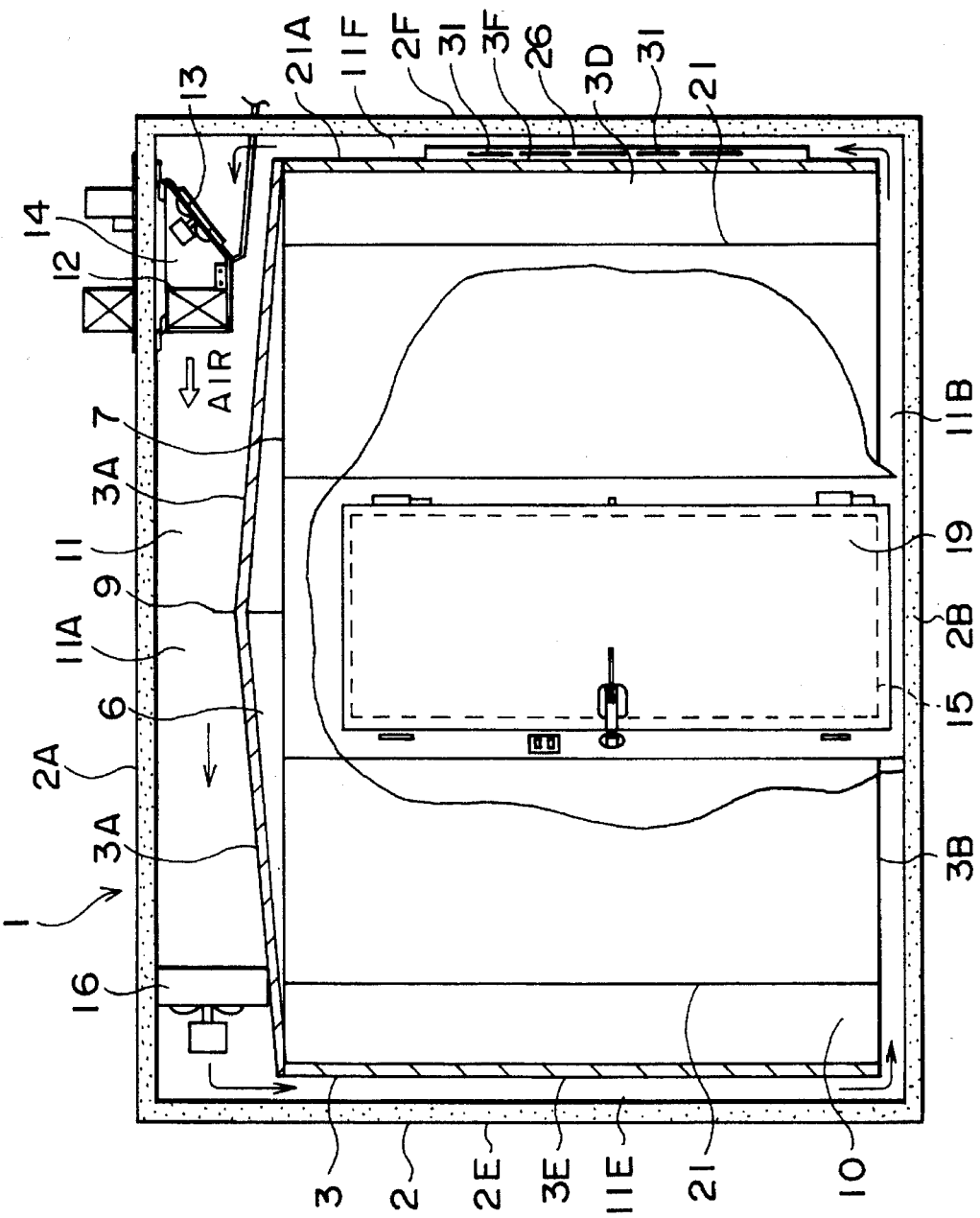
FIG. 1 is a front cross-sectional view illustrating a cold storage unit according to the present invention.
Figure 2:
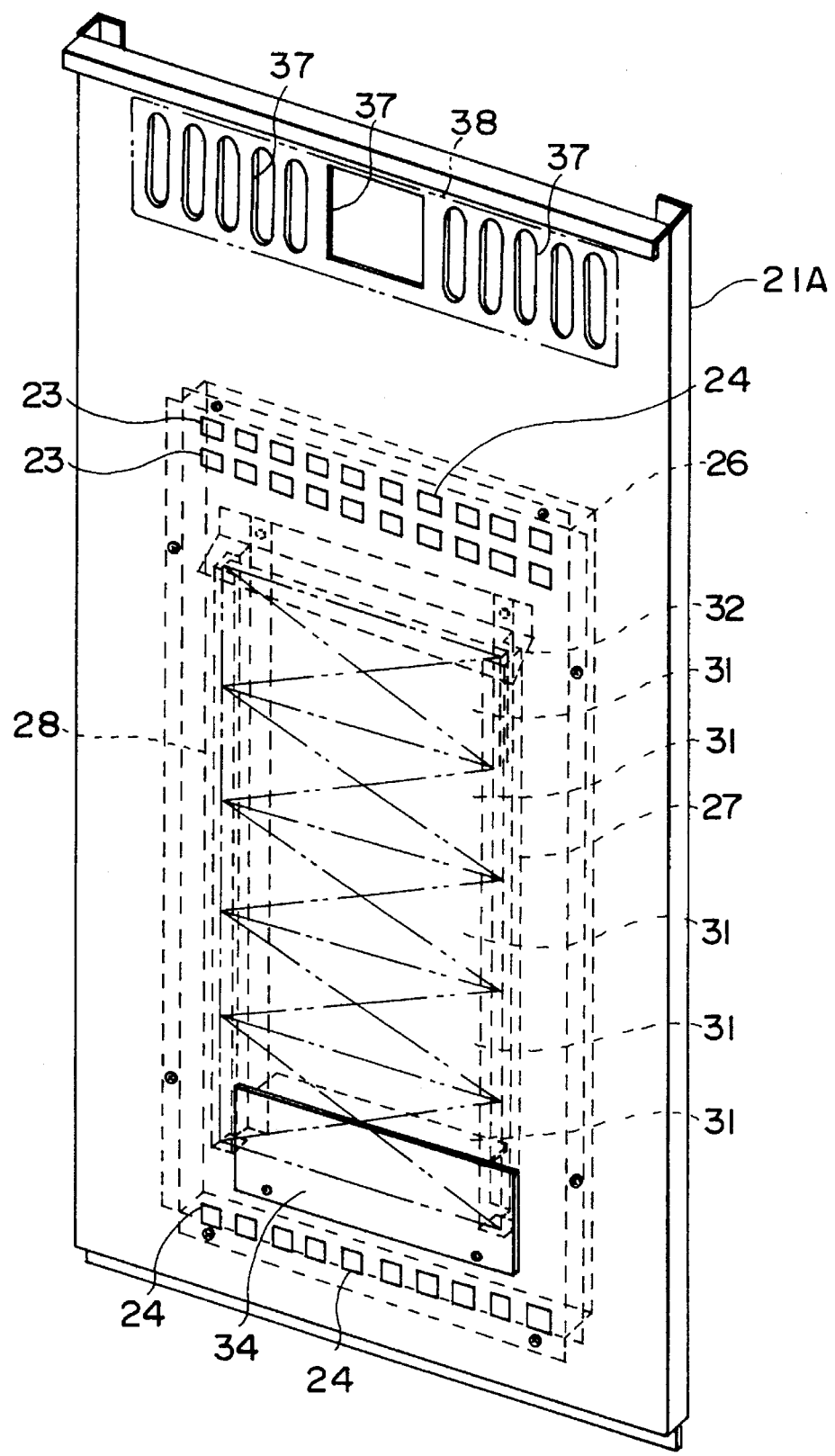
FIG. 2 is a perspective view illustrating a panel constituting a right side wall of an inner housing in the cold storage unit.

Referring to FIG. 1 and 2, there is shown a cold storage unit 1 according to the present invention, such as a prefabricated storage unit. A highly heat-conductive inner housing 3 is located in a heat-insulting outer housing 2 with a space therebetween so as to define a closed storage chamber 10 is formed in the inner housing 3. Around the storage chamber 10, that is, between the inner and outer housings 2, 3 is a space including a cold air circulating space 11. The outer housing 2 is composed of a plurality of heat-insulating panels each having protruded or recessed parts at sides connected with adjacent panels and assembled together in a box-like shape, and a product take-in and -out opening 15 is formed in the center part of the front wall of the outer housing 2, and is opened closed by a heat-insulating door 19.

Figure 3:
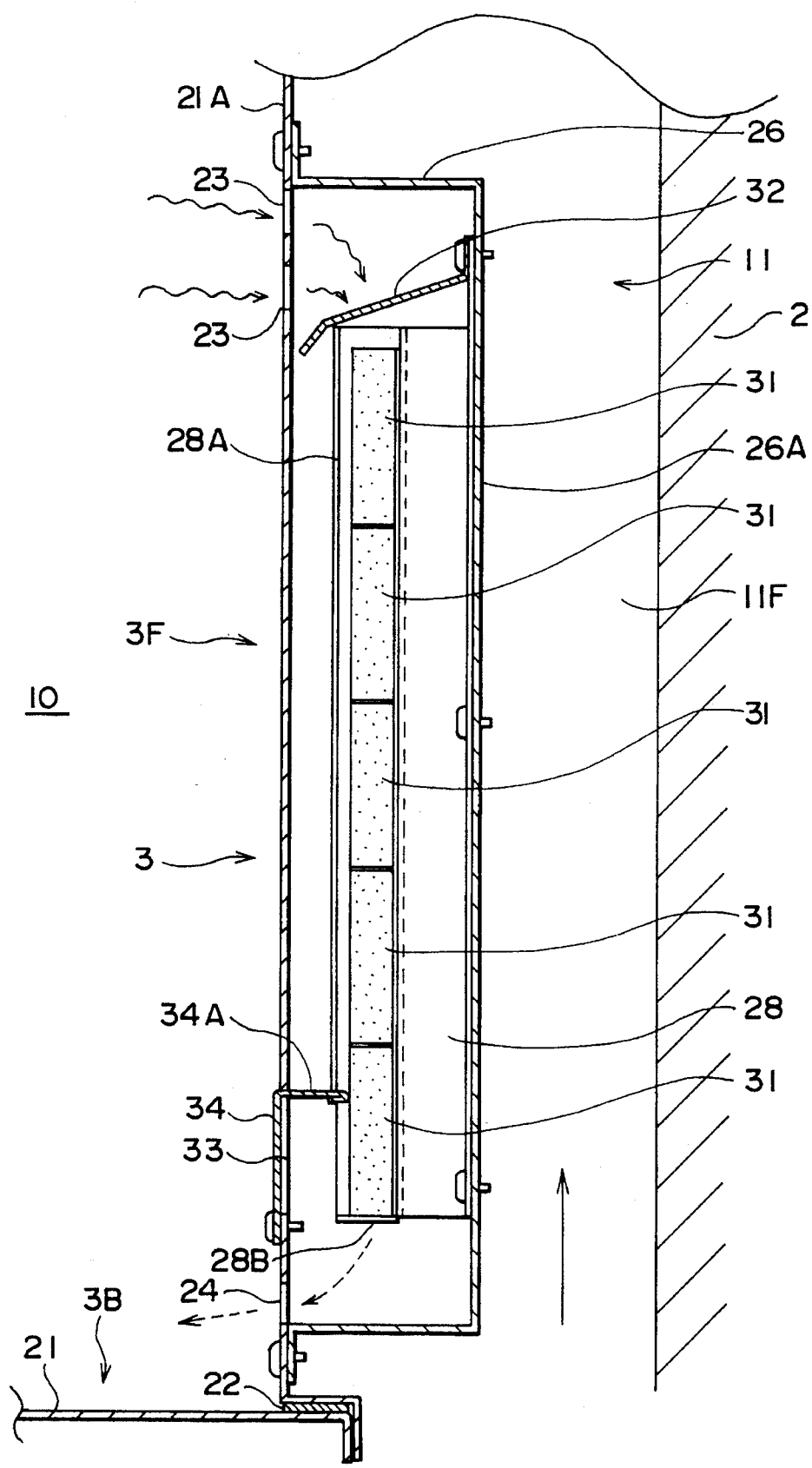
FIG. 3 is an enlarged longitudinal sectional view illustrating the cold storage unit in the panel part.
Figure 4:
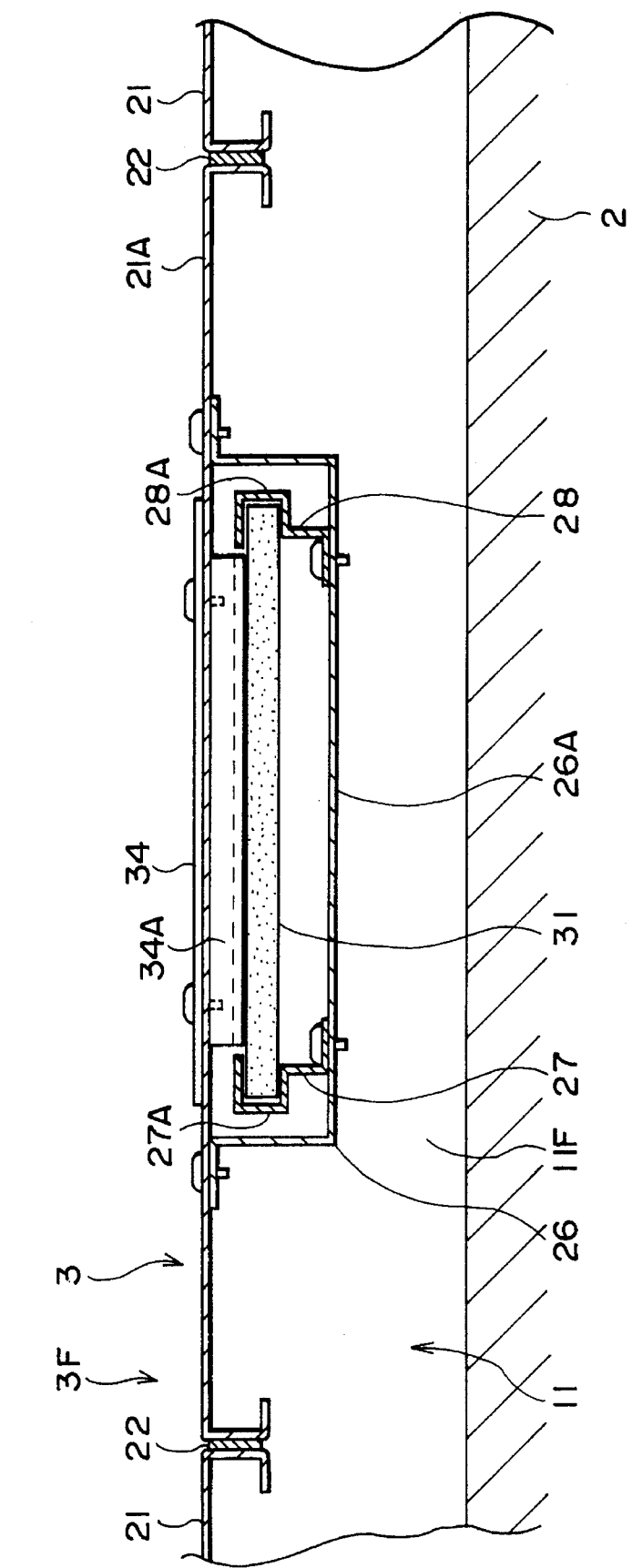
FIG. 4 is an enlarged plan sectional view illustrating the panel part of the cold storage.

The inner housing 3 is composed of a top wall 3A, a bottom wall 3B, and front and rear, and left and right side walls 3D, 3E, 3F (of which the front side wall is not shown), and support walls 6, 7 which are connected respectively to the upper ends of the front and rear walls 3D that are opposed to each other. The bottom walls 3B, and the side walls 3D, 3E, 3F are composed of a plurality of panels 21, ... (including a panel 21A in the right side wall 3F) formed of stainless sheet material, are fixed to the outer housing 2 through the intermediary of fixtures (not shown) with a space between the panels 21 and the outer housing 2. Further, as shown in FIG. 3, seal members 22 are interposed between the panels 21. Further, the top wall 3A of the inner housing 3 is set on the upper edges of the support plates 6, 7 and the left and right side walls 3E, 3F, and is secured thereto through the intermediary of fixtures which are not shown so that the top wall 3A is inclined downward on left and right sides from a summit support beam 9.

In particular, a one panel 21A are constituting the right side wall 3F of the inner housing 3 has a structure, as shown in FIG. 2, in which the upper and lower parts of the panel 21A formed therein with vent holes 22, . . . , 24, . . . , respectively, and a box member 26 also formed of stainless sheet material, is attached vertically to the rear surface (on the cold air circulating space 11 side) of the panel 21A by screws tightened on the storage chamber 10 side, over a range covering the vent holes 23, 24. This box member 26 is rectangular, being open at only one side facing the panel 21A, and the open side of the box member 6 is closed when it is attached to the panel 21A, and accordingly, the box member 26 is isolated from the cold air circulating space 11.

It is noted that the thickness of the box member 26 is limited to about one-half of the width of the cold air circulating space 11 so as to avoid hindering the stream of cold air circulating through the cold air circulating space 11. Further, the vent holes 23, 24 are located corresponding to the upper and lower parts of the box member 26, and accordingly, the storage chamber 10 and the box member 26 communicate with each other at the upper and lower parts thereof.

Slide rails 27, 28, as holding members, opposed and laterally spaced are laid vertically along the inner surface of a vertical wall 26A of the box member 26, between the upper and lower vent holes 23, 24, and are vertically fastened by screws. Each of the slide members 27, 28 is composed of a U-like cross-sectional flange 27A, 28A, the flanges 27A, 28A being opposed to each other and vertically extending, and a bottom flange 28B (a bottom flange at the bottom of the slide rail 27 is not shown). The flanges 27A, 28A being laid below the holding flanges 27A, 28A, are spaced from each other.

Further, adsorbing and decomposing sheet-like agents 31, . . . are located in the box member 26, being held between the slide rails 27, 28. Each of these adsorbing and decomposing sheet-like agents 31 is composed of a mixture of active carbon and an ethylene decomposing catalyst, such as palladium, which are kneaded together and are then packed in a sheet-like shape on an air-permeable surface material. The weight of the adsorbing and decomposing sheet-like member, is, for example, about 200 g if it has dimensions of about 270 mm×400 mm×100 mm. It is lightweight, and further, it has suitable flexibility so that no cracking or the like occurs. Further, the handling is very easy during assembly or the like thereof. It is noted that in this embodiment, five sheets of the adsorbing and decomposing sheet-like agents are used.

These adsorbing and decomposing sheet-like agents 31, . . . are held between the slide rails 27, 28, and are vertically stacked one upon another, along the panel 21A of the inner housing 3. Both side parts of the adsorbing and decomposing sheet-like agents 31 are held at the holding flanges 27A, 28a of the slide rails 27, 28 so as to be vertically movable, and the opposite side parts of the lower surface of each of the adsorbing and decomposing sheet-like agents 31 at the lower end thereof, are set on the bottom flanges 28b. Thus, the adsorbing and decomposing sheet-like agents 31 are held between the slide rails 27, 28 so as to be movable only in the vertical direction.

Further, a visor 32 is laid above the adsorbing and decomposing sheet-like agents. This visor 32 is secured at its rear end to the vertical wall 26A of the box member 26 with screws, and is inclined downward toward the panel 21A with its distal end being spaced from the panel 21A, and accordingly, its shields the adsorbing and decomposing sheet-like agent 31 from above.

Further, a rectangular take-out opening 33 is formed in the panel 21A between the lower ends of the holding flanges 27A, 28A and the bottom flange 28B of the slide rails 27, 28, having a width extending between both slide rails 27, 28. Further, the take-out opening 33 is closed by a cover 34 which is attached to the panel 21 by screws so as to be removable from the storage chamber 10 side and which is also made of stainless steel. This cover 34 has a retainer 34A which is adapted to enter the box member 26 through the take-out opening 33. The front end of the retainer 34A abuts against the lowermost adsorbing and decomposing sheet-like agent 31 for retaining the latter.

A plurality of through-holes 37 are formed in the panel 21A above the box member 26, which are normally closed by a closing cover plate 38. These through-holes 37 are required for directly introducing cold air into the storage chamber 10 from the cold air circulating space 11 so as to regulate the temperature. Thus, since the box member 26 and the through-holes 37 are integrated in one and the same panel 21A, and accordingly, the generality during assembly or modification of the cold storage 1 is enhanced.

A cooling device 14 is attached to the right end part of the lower surface of the top wall 2A of the outer housing 2, within the cold air circulating space 11. The cooling device 14 is composed of a cryostat 12 constituting a part of a refrigerating cycle, and a first blower device 13 whose operation is controlled so as to be turned on and off between upper and lower limit temperatures by means of a controller which is not shown, in accordance with an output from a temperature sensor (not shown), for detecting temperature of cold air in the cold air circulating space 11.

Further, a second blower 16 which is attached to the left end part of the top wall 2A of the outer housing 2 within the cold air circulating space 11, is normally operated. The cold air circulating space 11 is composed of an upper space 11A above the top wall 3A, a lower space LIB below the bottom wall 3B, a front side space which is not shown, outside of the front wall, a rear side space (not shown) outside of the rear side wall 3D, a left side space lie outside of the left side wall 3E and a right side space 11F outside of the right side wall 3F, and in this embodiment, the cooling device 14 is located in the upper space 11A.

Explanation will be made of operation of the cold storage 1 having the above-mentioned arrangement. At first, foods such as vegetables or fruits or agricultural products such as fresh flowers are introduced through the product take-in and -out opening 15 into the storage chamber 10, and the temperature of the storage chamber 10 is adjusted to a set temperature of, for example, 0 to 3 deg. C. Thereafter when a power source is turned on so as to energize the cooling device 14, the cooling device is operated by the controller (not shown) in accordance with an output from the temperature sensor since the temperature of the cooling air circulating space 11 is higher than the set temperature. Further, air sucked into the cooling device 14 by the first blower 13 flows into the cryostat 12 so as to be cooled, and thereafter, flows into the upper space 11A, then being forcibly circulated through the cold air circulating space 11 outside of the inner housing 3, as indicated by the arrows shown in FIG. 1.

Further, when the temperature of the cold air circulating space 11 becomes below the lower limit temperature of, for example, −3 deg. C., the first blower 13 is stopped when it becomes above the higher limit temperature of, for example, −1 deg. C., the first blower 13 is operated. Accordingly, the walls of the inner hosing 3 are cooled through the circulation of the cold air, and accordingly, the storage chamber 10 is indirectly cooled by radiation heat from the walls. Further, the second blower 16 effects a forced pressure differential through the circulated cold air in the cold air circulating space 11 so as to diffuse the cold air over a wide range within the cold air circulating space, and accordingly, the cold air is uniformly circulated in the cold air circulating space 11 so as to efficiently cool the inner housing 3. That is, the storage chamber 10 is cooled at every wall of the inner housing 3.

Meanwhile, ethylene gas which is emitted from the stored agricultural products due to their metabolism, flows into the box member 26 through the upper vent holes 23 together with air, as indicated by the arrows shown in FIG. 3, due to natural convection, and then flows through and around the adsorbing and decomposing sheet-like agents 31 before it flows into the inner housing through the lower vent holes 24.

At this time, ethylene gas in the flowing air is chemically oxidized and decomposed by the ethylene decomposing catalyst in the adsorbing and decomposing sheet-like agents 31, and is then adsorbed by the active carbon (the adsorbed ethylene is also oxidized and decomposed by the catalyst). Accordingly, odor produced from the agricultural products is also adsorbed by the active carbon in the adsorbing and decomposing sheet-like agents 31. Accordingly, the ethylene gas in the storage chamber 10 is prevented from increasing its concentration so as to restrain the progress of deterioration of the agricultural products while malodor in the storage chamber 10 is removed so as to prevent deterioration of other foods due to transferring of the odor.

In particular, the ethylene decomposing catalyst in the adsorbing and decomposing sheet-like agent 31 has an ethylene treating capability which is substantially higher than that of conventionally used green stuff, and accordingly can rapidly lower the concentration of ethylene gas in the storage chamber 10, and the number of the adsorbing and decomposing sheet-like agents 31 to be used can be reduced so as to reduce the cost. Further, the ethylene decomposing catalyst chemically decomposes ethylene, no regeneration of the catalyst, as is required for the conventional green stuff which can only adsorb ethylene, is required, and accordingly, the maintainability can be enhanced.

It is noted that although ethylene decomposing catalyst in the adsorbing and decomposing sheet-like agent 31 is not substantially affected by humidity. However, should condensate or the like drop and stick to the adsorbing and decomposing sheet-like agents 31 and then permeate thereinto, the fluidity of air would be deteriorated greatly, and accordingly, the ethylene treating capability would be lowered. However, according to the present invention, the visor 32 provided above the adsorbing and decomposing sheet-like agents 31, . . . which are vertically stacked, can prevent the condensate from dropping and sticking to the adsorbing and decomposing sheet-like agents 31. Accordingly, it is possible to eliminate the problem in which the ethylene treating capability is lowered by the moisture permeation.

Further, according to the present invention, the box member 26 is attached to the panel 21A on the cold air circulating space 11 side so that the upper and lower parts of the box member 26 are communicated with the storage chamber 10 through the vent holes 23, 24, and accordingly, the adsorbing and decomposing sheet-like agents 31, . . . can be attached being communicated with the storage chamber 10 without narrowing the internal space of the storage chamber 10.

Next, in the case of replacement of the adsorbing and decomposing sheet-like agents 31, . . . , the cover 34 is removed from the panel 21A by unscrewing so as to open the take-out opening 33. Further, the adsorbing and decomposing sheet-like agents 31 are taken into the storage chamber 10 through the opening 33 from which the cover is removed, and then they are withdrawn. Further, new adsorbing and decomposing sheet-like agents 31 are taken into the box member 26 through the opening 33, and are inserted between the slide rails 27, 28, and are successively pushed up until five adsorbing and decomposing sheet-like agents 3i are stacked one upon another. Thereafter, the opening 33 is closed by the cover 34, and then the lowermost adsorbing and decomposing sheet-like agent 31 is retained by the retainer 34A.

Thus, according to the present invention, upon replacement of the adsorbing and decomposing sheet-like agents 31, the inside of the box 26 can be accessed from the storage chamber 10 through the opening 33 from which the cover 34 is removed. Thereby it is possible to enhance the maintainability.

As detailed above, according to the present invention, the adsorbing and decomposing sheet-like agents 31 composed of ethylene decomposing catalyst and active carbon are provided being in communication with the storage chamber in the so-called indirectly cooling type cold storage unit, and accordingly, ethylene gas generated from agricultural products or the like stored in the storage is chemically oxidized and decomposed by the ethylene decomposing catalyst in the adsorbing and decomposing sheet-like agents, and are then adsorbed by the active carbon. Thus, the deterioration of the stored products can be restrained so that the products can be stored in a fresh condition for a long time. Further, the active carbon in the adsorbing and decomposing sheet-like agents can adsorb malodor in the storage chamber, it is possible to expect that the effect of deodorization can be enhanced.

In particular, the ethylene decomposing catalyst in the adsorbing and decomposing sheet-like agents has an ethylene treating capability which is substantially higher than that of conventionally used green stuff so that the concentration of ethylene gas in the storage chamber can be rapidly lowered, and further, the quantity of the catalyst can be decreased, thereby it is possible to lower the cost. Further, the regeneration of the ethylene decomposing catalyst, as is required for conventionally used green stuff, is not required, and accordingly, it is possible to enhance the maintainability. Further, the weight of the adsorbing and decomposing sheet-like agent is smaller than that of the conventional used green stuff plate, and no cracking or the like occurs, thereby it is possible to extremely facilitate the handling thereof during assembly or the like.

Further, the box member is attached to the wall of the inside housing on the cold air circulating space side so that the upper and lower parts of the box member communicate with the inner housing through the vent holes formed in the box member, and accordingly, air flows from the storage chamber into the box member through the vent holes under natural convection so as to circulate around the adsorbing and decomposing sheet-like agents in the box member. Accordingly, the adsorbing and decomposing sheet-like agents can be attached in communication with the storage chamber without narrowing the space of the storage chamber.

Further, the holding member which can movably hold the adsorbing and decomposing sheet-like agents is attached in the box member, and the take-out opening 33 for the adsorbing and decomposing sheet-like agents is formed in the side wall of the inner housing, facing the inside of the box member. Further, the take-out opening is closed by the removable cover, and accordingly, the cover can be removed upon replacement of the adsorbing and decomposing sheet-like agents so that the inside of the box member can be accessed from the storage chamber through the opening from which the cover is removed, thereby it is possible to enhance the maintainability.

Further, since the adsorbing and decomposing sheet-like agents are vertically stacked one upon another along the side wall of the inner housing, and since the visor is laid above the adsorbing and decomposing sheet-like agents stacked one upon another, no condensate drops and sticks to the adsorbing and decomposing sheet-like agents. This eliminates a problem in which the moisture permeates into the adsorbing and decomposing sheet-like agents so that the treating capability of the latter is lowered.

What is claimed is:

1. A cold storage unit comprising:

a heat-insulating outer housing, an inner housing of a heat conductive material in said outer housing with a space therebetween and defining within said inner housing a storage chamber, a cooling device located to circulate cold air in the space between said outer and inner housings to indirectly cool the storage chamber, and an adsorbing and decomposing sheet-like agent comprising an ethylene decomposing catalyst and active carbon provided in communication with said storage chamber.

2. A cold storage unit as set forth in claim 1, further comprising a box member attached on a side wall of said inner housing on the cold air circulating space side, said adsorbing and decomposing sheet-like agent being located in said box member, and vent holes being located in said inner housing side wall through which upper and lower parts of said box member communicate with said storage chamber for a flow of air from the storage chamber through said sheet-like agent in said box.

3. A cold storage unit as set forth in claim 2, further comprising a holding member in said box member for movably holding said adsorbing and decomposing sheet-like agent, a take-out opening for said adsorbing and decomposing sheet-like agent in the side wall of said inner housing to which the box member is attached facing the inside of said box member, and a removable cover on said inner chamber side wall for said take-out opening.

4. A cold storage unit as set forth in claim 1, wherein said adsorbing and decomposing sheet-like agent is vertically laid along the side wall of said inner housing, and further comprising a visor in said box above said adsorbing and decomposing sheet-like agent.

5. A cold storage unit as set forth in claim 1, wherein said sheet-like agent is flexible.

6. A cold storage unit as set forth in claim 1, wherein said ethylene decomposing catalyst is palladium.

7. A cold storage unit comprising:

a heat-insulating outer housing, an inner housing of a heat conductive material in said outer housing with a space therebetween and defining within said inner housing a storage chamber, a cooling device located to circulate cold air in the space between said outer and inner housings to indirectly cool the storage chamber, an adsorbing and decomposing sheet-like agent comprising an ethylene decomposing catalyst and active carbon provided in communication with said storage chamber, and a box member attached on a side wall of said inner housing on the cold air circulating space side, said adsorbing and decomposing sheet-like agent being located in said box member, and vent holes being located in said box member and said inner housing side wall through which upper and lower parts of said box member communicate with said storage chamber for a flow of air from the storage chamber through said sheet-like agent in said box.

8. A cold storage unit as set forth in claim 7, wherein said sheet-like agent is flexible.

9. A cold storage unit as set forth in claim 7, wherein said ethylene decomposing catalyst is palladium.

* * * * *